United States Patent [19]
Kahil

[11] Patent Number: 5,937,747
[45] Date of Patent: Aug. 17, 1999

[54] CONTAINER CRUSHER AND METHOD OF CRUSHING

[76] Inventor: Susan Marjorie Kahil, 12B Durham Road, Sidcup Hill, Sidcup, Kent, United Kingdom, DA14 6LH

[21] Appl. No.: 09/021,847

[22] Filed: Feb. 11, 1998

[30] Foreign Application Priority Data

Feb. 14, 1997 [GB] United Kingdom .................... 9703155
Jun. 2, 1997 [GB] United Kingdom .................... 9711157

[51] Int. Cl.⁶ ..................................................... B30B 9/00
[52] U.S. Cl. ........................... 100/35; 100/265; 100/902; 241/99
[58] Field of Search ................................ 100/35, 92, 265, 100/902; 241/99

[56] References Cited

U.S. PATENT DOCUMENTS 2,313,398   3/1943   Ronning .
5,448,946   9/1995   Laux ........................................ 100/902
5,802,968   9/1998   Kirschner et al. ....................... 100/902

FOREIGN PATENT DOCUMENTS 0554646   8/1993   European Pat. Off. .

*Primary Examiner*—Stephen F. Gerrity
*Attorney, Agent, or Firm*—Pearson & Pearson

[57] ABSTRACT

A container crusher, whereby a container is crushed from top to bottom into a compact neat form, to save extra space in the refuse bin or to save for recycling. The crusher has a central aperture or recess with cut out grooves for containers with handles. Surrounding the central aperture or recess is a concave area which rests or fits onto the container just below its neck. There is provided a separate insert for smaller sized containers, which slots into the central aperture or recess. At each end of the crusher are hand grips. To crush the container the crusher is placed onto the container and the cap is removed. With both hands, one at each end of the grips, pressure is applied downwards until the container is compressed.

6 Claims, 5 Drawing Sheets

CONTAINER CRUSHER AND METHOD OF CRUSHING

BACKGROUND OF THE INVENTION

1. Field of the Invention

This invention relates to an empty plastic container crusher.

There are many different types of plastic containers that we use in our everyday lives, which when finished with are usually thrown away or kept for recycling. Although used plastic containers such as bottles are a small contributor to the domestic waste stream in terms of weight, they cover a large surface area, because of them being so bulky and full of air. Plastic containers use up much unwanted space in our refuse and recycling bins or banks. For a plastic container to arrive at its smallest crushed compact form, it should be crushed from the top to the bottom.

2. Description of the Prior Art

Mechanical crushers for aluminium cans are sometimes provided in recycling skips, but plastic containers are more usually crushed using hands and feet which involves compressing them sideways so that they still take up unnecessary space. It is difficult to crush a tall plastic container from top to bottom by hand or foot, since it tends to collapse to one side, so that it cannot become as small and compact as it could be. Another advantage of crushing a container from top to bottom is that more and more companies are now putting a special code on the base of the container to make sorting easier. Using this method would keep the code intact and readable.

Landfill sites are a common way of disposing of refuse, but finding land is an increasing problem and bulky plastic containers take up a relatively large percentage of domestic waste. Ideally all used plastic containers should be recycled, but the idea of saving bulky clutter at home, tends to put the consumer off.

SUMMARY OF THE INVENTION

It is accordingly an object of the present invention to provide a simple device that can be used repeatedly at home, which can also crush a full range of plastic containers to a third or less of their original size, so as not only to save extra space in the refuse bin, but also to start to save for recycling, thus helping the environment. The recycler would be able to save many more containers over a longer period of time, regardless of whether the crushed containers are transported by the consumer to a bottle bank or placed in a refuse bag at home. There would be fewer trips to empty them and the recycling banks would store a greater quantity over a longer period of time. It is a further object of this invention to provide a container crusher which ensures that a greater number of crushed containers can be transported for recycling in any one truck load. The aim is to transport as much plastic and as little air inside the containers as possible. Having plastic containers ready crushed, up to twenty times more plastic could be transported by lorry or stored in a recycling bank.

The present invention consists in a container crusher for crushing containers such as bottles by exerting pressure along the container axis, the crusher comprising a central engagement section including an aperture or recess to receive a neck of the container, a concave area surrounding the aperture to engage a shoulder of the container and handles positioned substantially symmetrically on opposite sides of the engagement section, wherein in use a force having a component parallel to the container axis is applied to each contact point, so as to crush the container.

The crusher of this invention can be used to crush or compress empty plastic containers such as bottles to their smallest compact form, ready for disposal or recycling. This crusher can be effectively used to crush a full range of plastic containers from the smallest (using a separate insert in the aperture) up to five litres in volume.

Preferably the crusher is made of recycled plastic, but it may instead be made from other materials such as plastic, metal or wood.

In some cases the engagement section may comprise a projection.

In some cases the crusher may have more than one insert for different sizes and shapes of containers.

Further objects and advantages of the invention will become apparent from the following detailed description when read with reference to the accompanying drawings which illustrate preferred embodiments thereof.

DETAILED DESCRIPTION OF THE PREFERRED EMBODIMENTS

Figure 1:
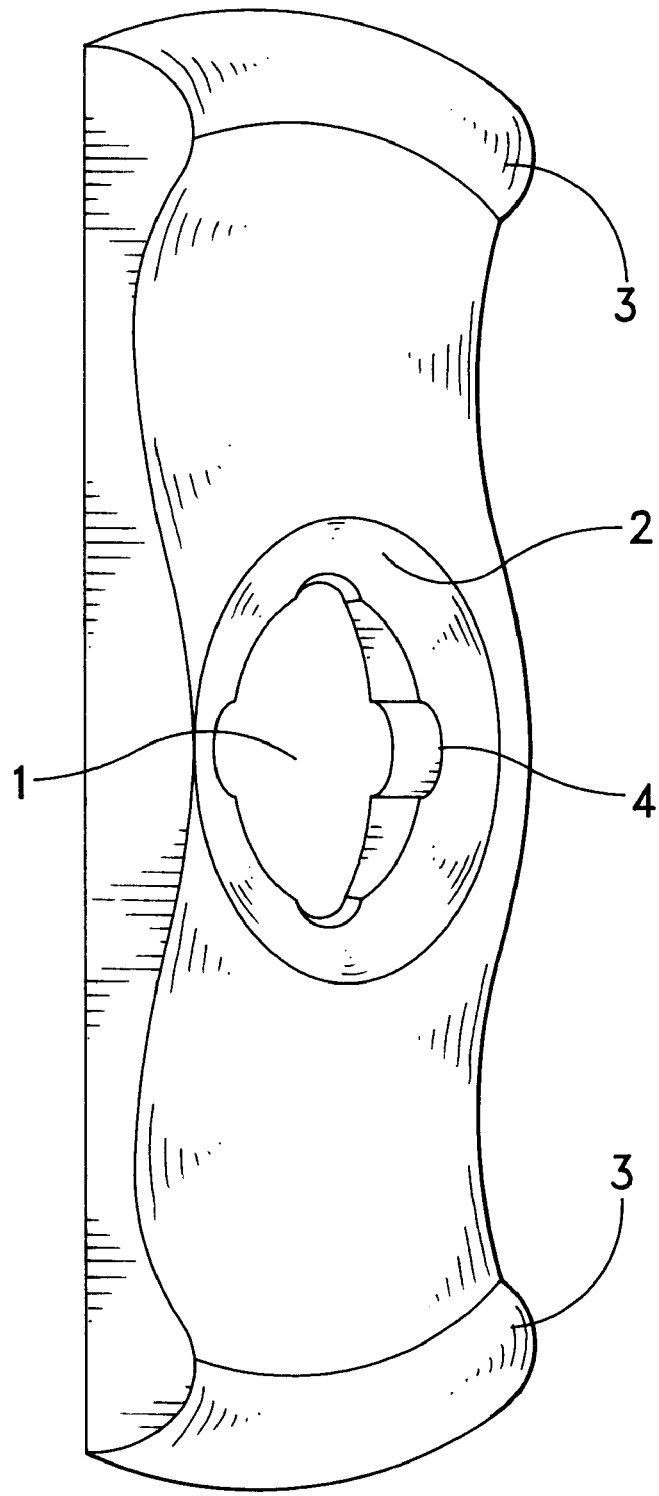
FIG. 1 shows a crusher in accordance with the invention.
Figure 2:
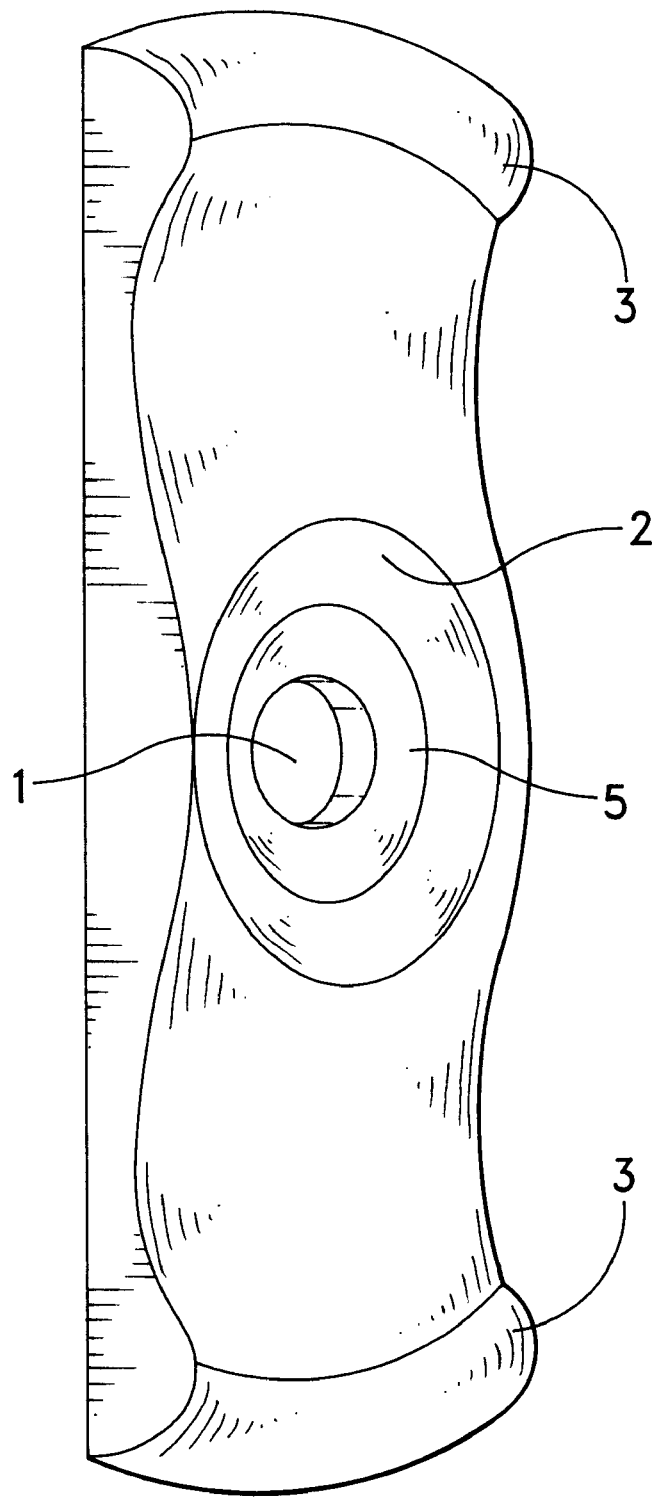
FIG. 2 shows the crusher of FIG. 1 with an insert fitted therein.
Figure 3A:
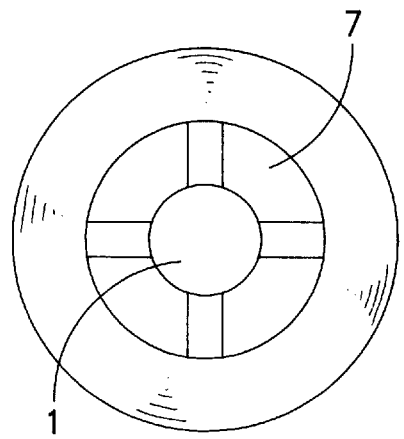
FIGS. 3A, 3B and 3C show front, side and back views of the insert of FIG. 2.
Figure 3B:
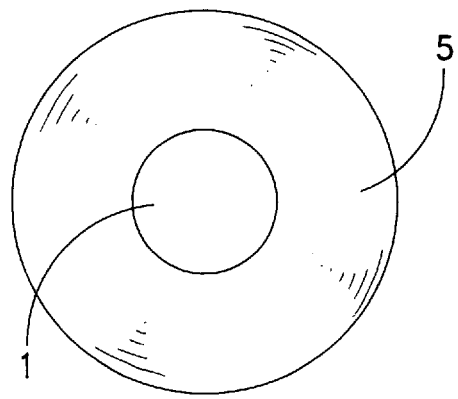
Figure 3C:
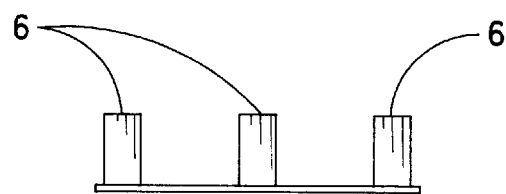
Figure 4A:
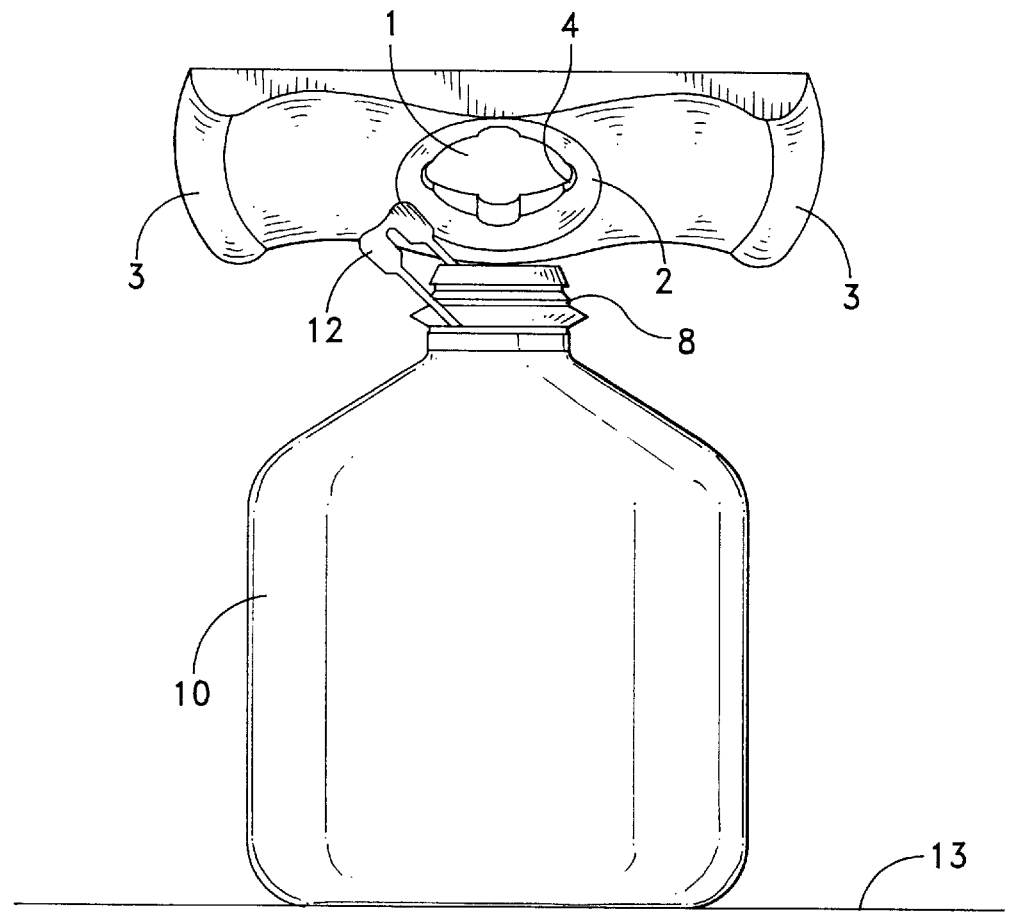
FIGS. 4A and 4B illustrate the crusher of FIG. 1 being used to crush an empty plastic container.
Figure 4B:
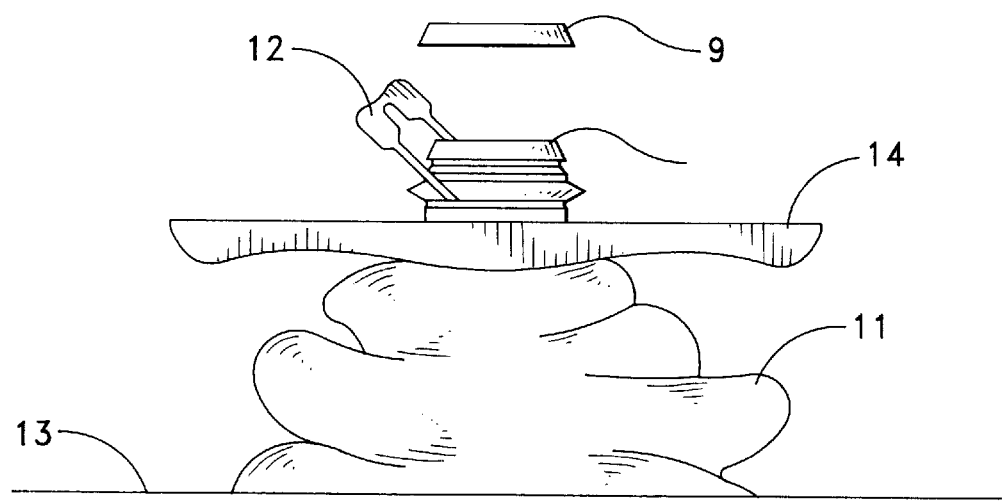
Figure 5A:
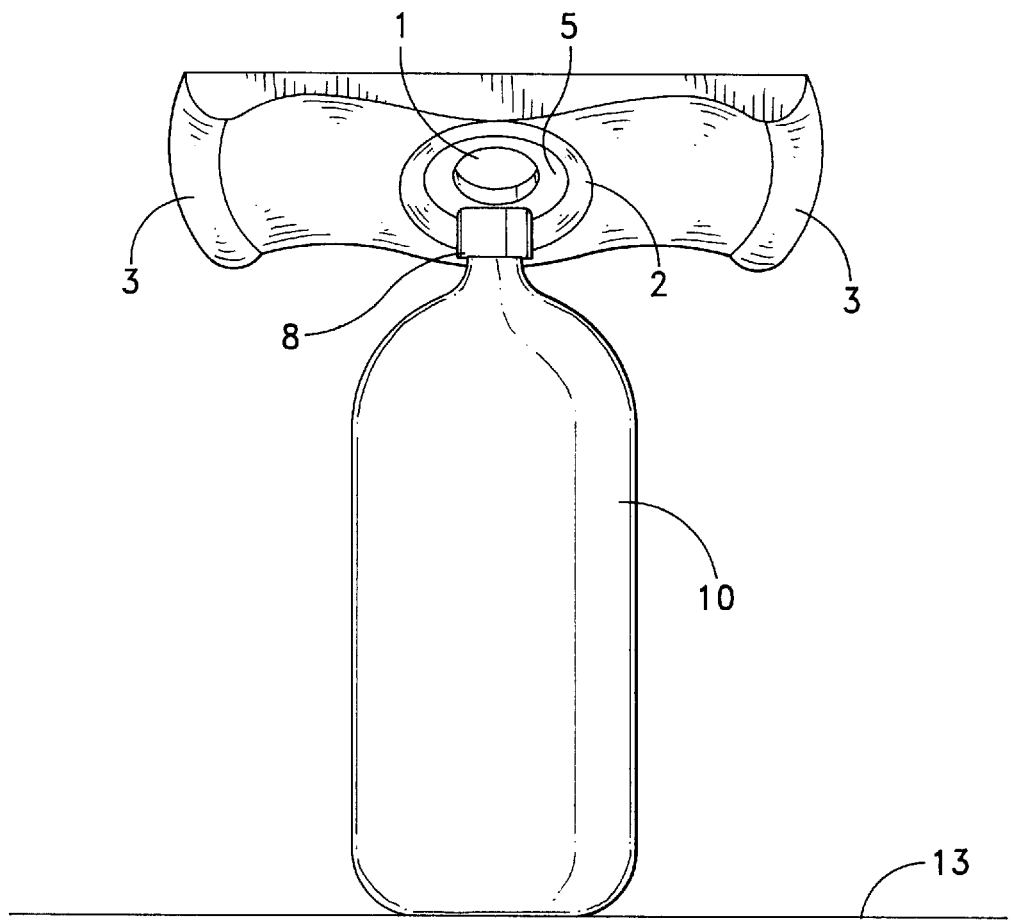
FIGS. 5A and 5B illustrate the use of the insert when crushing a plastic container of smaller size.
Figure 5B:
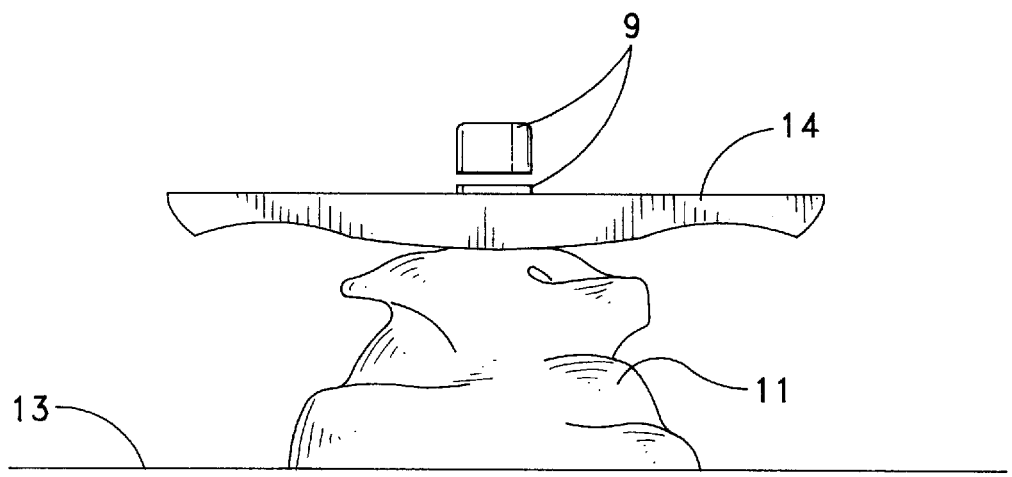

Referring to the drawings the crusher comprises an elongate body with a central circular clearance or hole 1, which is placed onto the neck of the container as in FIGS. 4A and 5B. The crusher has two or more cut out grooves 4, which allow larger containers with or without handles to pass through the central clearance. Surrounding the central clearance 1, is a concave area 2, which rests or fits onto the container, ready for the user to apply pressure as in FIGS. 4A and 5A. At each end of the crusher there are hand grips 3, which always face down towards the container and are on the same side as the concave area 2. There is provided a separate insert 5, which slots into the crusher's central clearance 1, allowing for smaller sized containers to be compressed. In FIGS. 3A, 3B and 3C the illustrations show the separate insert's front view, as seen in FIGS. 2, 4A and 4B. The insert's side view 6, shows the slots that fit into the cut out grooves 4. This is seen clearer in the insert's back view 7. The insert may be arranged to snap fit into position, for example by engagement of an annular bead.

The use of the crusher is shown in FIGS. 4A, 4B, 5A and 5B. The container is first emptied and placed onto a firm flat surface 13, then the cap or top is removed and retained 8. Depending on the size of the container, the crusher is used with or without the insert. The top of the container should pass through the central clearance 1 and if there are any handles 12, they will pass easily through the grooves 4. The concave area 2 should then sit or rest onto the container just below its top 14. The crusher is held firmly with both hands, one at each end of the hand grips 3, and pressure is applied evenly onto the container 10, downwards until it is compressed as indicated by 11. The cap or top is then replaced 9 and the crusher is removed. In FIGS. 4A and 4B the example illustrates the crusher without the insert, crushing a container with a handle. In FIGS. 5A and 5B the example illustrates the crusher with its insert crushing a smaller container. The same principle is used on both examples.

What is claimed is:

1. A container crusher for crushing plastic containers by exerting pressure along a longitudinal axis of the container, the crusher comprising a central engagement section including an opening to receive a neck of the container, a concave area surrounding said opening to engage a shoulder of the container and handles positioned substantially symmetrically on opposite sides of said engagement section, wherein in use a force having a component parallel to said longitudinal axis is applied to each contact point, so as to crush the container.

2. A container crusher according to claim 1, wherein the crusher is an elongate member defining a crusher axis, the engagement section being located substantially at a mid-point of said crusher axis.

3. A container crusher according to claim 2, wherein the handles are located on the crusher member axis on either side of said mid-point.

4. A container crusher according to claim 1, wherein said engagement section further comprises a removable insert for coupling to said opening, to reduce its size to enable smaller containers to be crushed.

5. A container crusher according to claim 4, wherein said insert is arranged to snap-fit into said opening of the crusher.

6. A method of crushing a plastic container having a longitudinal axis comprising providing a container crusher having a central engagement section including an opening to receive a neck of the container, a concave area surrounding said opening to engage a shoulder of the container and handles positioned substantially symmetrically on opposite sides of said engagement section and further comprising engaging a first end of a container to be crushed in said opening of the crusher, supporting a second opposite end of the container and applying simultaneously to each handle a force having as component parallel to said longitudinal container axis.

* * * * *